(12) United States Patent
Ouderkirk (10) Patent No.: US 10,488,921 B1
(45) Date of Patent: Nov. 26, 2019

(54) PELLICLE BEAMSPLITTER FOR EYE TRACKING

(71) Applicant: Facebook Technologies, LLC, Menlo Park, CA (US)

(72) Inventor: Andrew John Ouderkirk, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 212 days.

(21) Appl. No.: 15/699,319

(22) Filed: Sep. 8, 2017

(51) Int. Cl.
| | |
|---|---|
| *G02B 27/00* | (2006.01) |
| *G02B 27/10* | (2006.01) |
| *G06F 3/01* | (2006.01) |
| *G02B 27/14* | (2006.01) |
| *G02B 7/00* | (2006.01) |
| *G06F 1/16* | (2006.01) |
| *G02B 27/28* | (2006.01) |

(52) U.S. Cl.
CPC ............. *G06F 3/013* (2013.01); *G02B 7/008* (2013.01); *G02B 27/0081* (2013.01); *G02B 27/0093* (2013.01); *G02B 27/1006* (2013.01); *G02B 27/141* (2013.01); *G02B 27/142* (2013.01); *G02B 27/286* (2013.01); *G06F 1/163* (2013.01)

(58) Field of Classification Search
None
See application file for complete search history.

(56) References Cited

U.S. PATENT DOCUMENTS

| | | | | |
|---|---|---|---|---|
| 5,594,563 A | * | 1/1997 | Larson | G02B 5/26 349/74 |
| 2005/0185277 A1 | * | 8/2005 | Boyd | G02B 27/283 359/485.01 |
| 2011/0075257 A1 | * | 3/2011 | Hua | G02B 27/017 359/464 |
| 2015/0098059 A1 | * | 4/2015 | Ou-Yang | A61B 3/112 351/210 |
| 2017/0160518 A1 | * | 6/2017 | Lanman | G06F 3/011 |
| 2019/0243147 A1 | * | 8/2019 | Smithwick | G02B 5/0294 |

* cited by examiner

*Primary Examiner* — Parul H Gupta
(74) *Attorney, Agent, or Firm* — Fenwick & West LLP (57) ABSTRACT

A head-mounted display includes an electronic display configured to output image light, an optics assembly configured to direct image light in a first band from the electronic display to an eye box, an eye tracking unit configured to generate eye tracking information, and a pellicle beamsplitter configured to redirect light in a second band reflected from the eye box toward the eye tracking unit and transmit the image light in the first band. The pellicle beamsplitter is positioned along the optical axis between the optics assembly and the electronic display. The pellicle beamsplitter includes a front surface and a back surface. Each of the front surface and the back surface comprising a first radius curvature in a first plane and a second radius curvature in a second plane that is perpendicular to the first plane.

20 Claims, 6 Drawing Sheets

PELLICLE BEAMSPLITTER FOR EYE TRACKING

BACKGROUND

The present disclosure generally relates to eye tracking, and specifically relates to using a pellicle beamsplitter for eye tracking in virtual reality and/or augmented reality applications.

Some conventional head-mounted displays (HMDs) include an eye tracking subsystem. The eye tracking subsystem includes a camera that images a user's eye, and the images can be used by the eye tracking subsystem to track movement of the eye. Design of conventional eye tracking subsystems include eye tracking components that, e.g., separate optical paths for light used for eye tracking from optical paths used for content. To maximize comfort for a user of a HMD, it is desirable to minimize a size and weight of the HMD. Unfortunately, for HMDs that include eye tracking subsystems, the placement and design of eye tracking components often unduly increase the form factor and weight of the HMD.

SUMMARY

A pellicle beamsplitter is configured to separate optical paths for light used for eye tracking from optical paths for light used for display content in a head mounted display in a virtual reality (VR) environment, an augmented reality (AR) environment, a mixed reality(MR) environment, or some combination thereof. A head-mounted display includes an electronic display configured to output image light, an optics assembly configured to direct image light in a first band from the electronic display to an eye box, an eye tracking unit configured to generate eye tracking information, and a pellicle beamsplitter configured to redirect light in a second band reflected from the eye box toward the eye tracking unit and transmit the image light in the first band. The pellicle beamsplitter is positioned along the optical axis between the optics assembly and the electronic display. The pellicle beamsplitter includes a front surface and a back surface. Each of the front surface and the back surface includes a first radius curvature in a first plane and a second radius curvature in a second plane that is perpendicular to the first plane.

In some embodiments, the pellicle beamsplitter includes two supports and one or more deformable transparent sheets configured to transmit light in the first band and to redirect light in the second band. The supports are configured to fasten edges of the one or more deformable transparent sheets to produce the first radius curvature in the first plane. The supports are separated from each other to form a gap, and a surface attaching to the one or more deformable transparent sheets of each support includes the first radius curvature.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Head-Mounted Display Overview

Figure 1A:
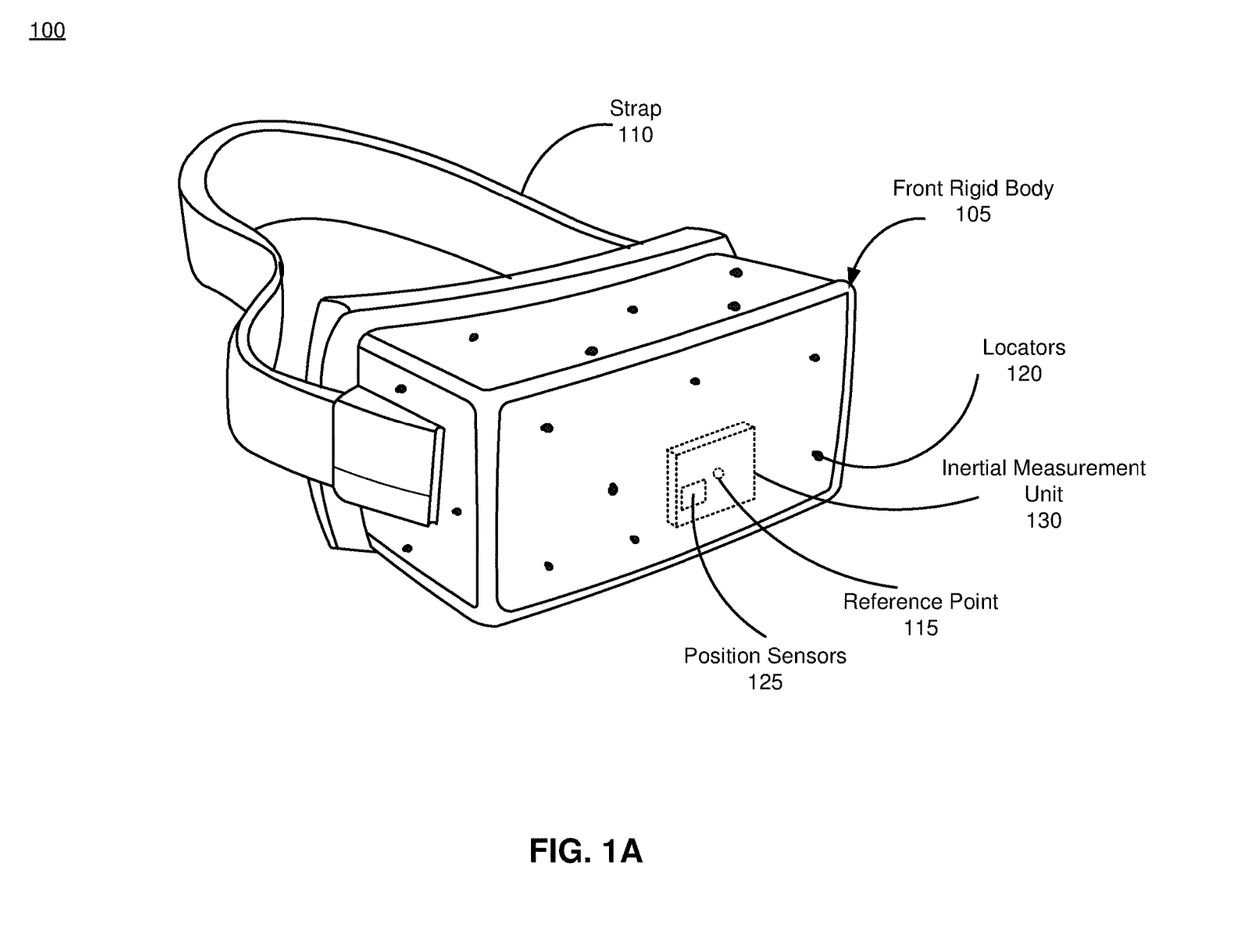
FIG. 1A is a diagram of a head-mounted display (HMD), in accordance with an embodiment.

FIG. 1A is a diagram of a head-mounted display (HMD) 100, in accordance with an embodiment. The HMD 100 includes a front rigid body 105 and a strap 110. The front rigid body 105 includes an electronic display element of an electronic display (not shown in FIG. 1A), an optics assembly (not shown in FIG. 1A), a pellicle beamsplitter (not shown in FIG. 1A), a reference point 115, locators 120, one or more position sensors 125, and an inertial measurement unit (IMU) 130. In the embodiment shown by FIG. 1A, the position sensors 125 are located within the IMU 130, and neither the IMU 130 nor the position sensors 125 are visible to a user. In some embodiments, the HMD 100 may act as a virtual reality (VR) headset, an augmented reality (AR) headset, a mixed reality (MR) headset, or some combination thereof. In embodiments that describe AR system environment, the HMD 100 augments views of a physical, real-world environment with computer-generated elements (e.g., images, video, sound, etc.). For example, one or more portions of the HMD 100 may be at least partially transparent. In embodiments that describe MR system environments, the HMD 100 merges views of physical, real-word environment with virtual environment to produce new environments and visualizations where physical and digital objects co-exist and interact in real time. The reference point 115, locators 120, IMU 130, and the position sensors 125 are discussed in detail below with respect to FIG. 4.

Figure 1B:
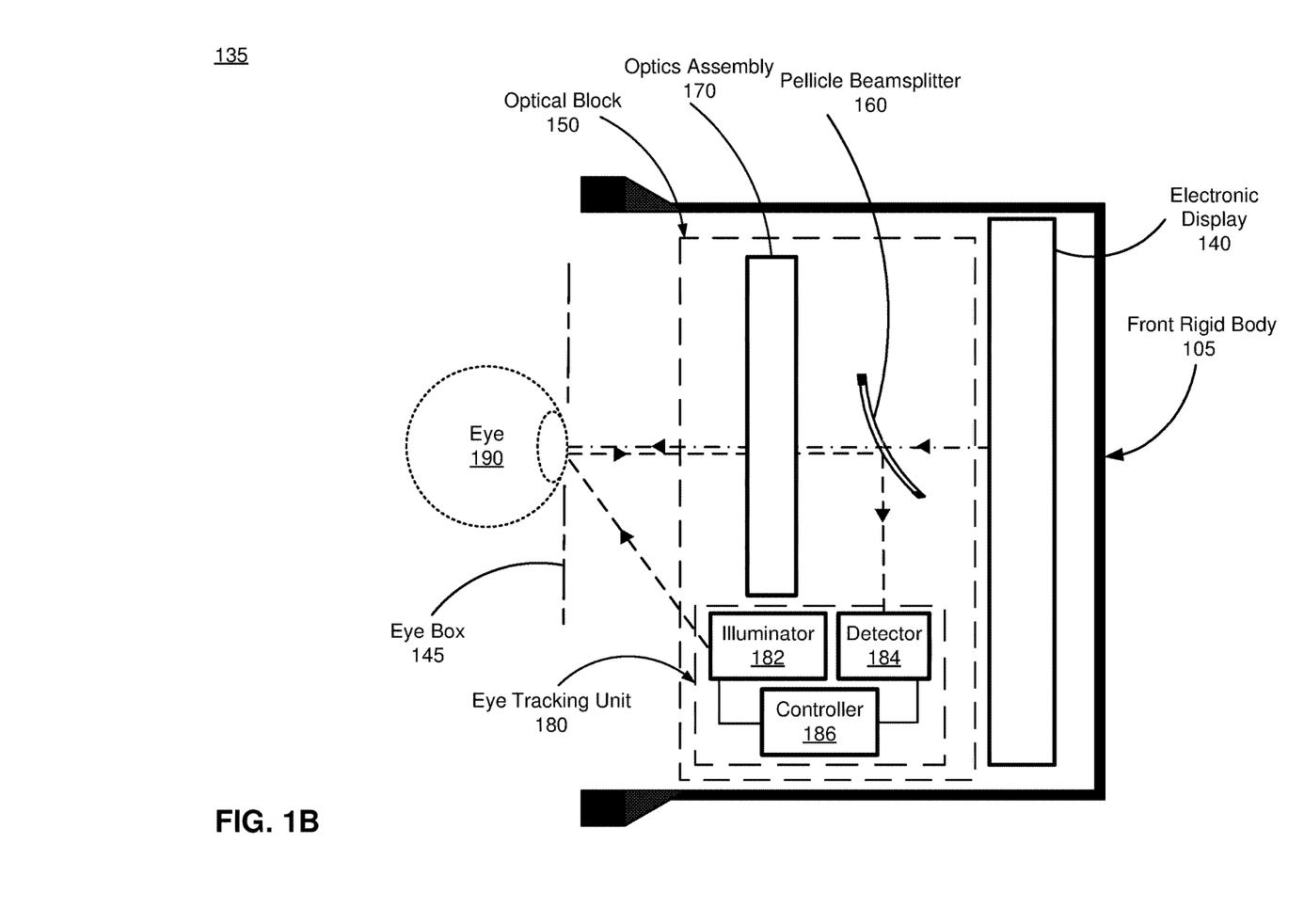
FIG. 1B is a cross section of a front rigid body of the head-mounted display in FIG. 1A, in accordance with an embodiment.

FIG. 1B is a cross section 135 of the front rigid body 105 of the HMD 100 in FIG. 1A, in accordance with an embodiment. As shown in FIG. 1B, the front rigid body 105 includes an electronic display 140 that provides image light to an eye box 145, and an optical block 150. The eye box 145 is a location of the front rigid body 105 where a user's eye 190 is positioned. For purposes of illustration, FIG. 1B shows a cross section 135 associated with a single eye 190, but an optical block 150, and/or electronic display 140 may provide altered image light to another eye of the user and to track the user's another eye.

The electronic display 140 displays images to the user. In various embodiments, the electronic display 140 may comprise a single electronic display or multiple electronic displays (e.g., a display for each eye of a user). Examples of the electronic display 140 include: a liquid crystal display (LCD), an organic light emitting diode (OLED) display, an active-matrix organic light-emitting diode display (AMOLED), a quantum organic light emitting diode (QOLED) display, a quantum light emitting diode (QLED) display, a transparent organic light emitting diode (TOLED) display, some other display, or some combination thereof. The electronic display 140 emits content within a first band of light (e.g., in a visible band).

The optical block 150 includes a pellicle beamsplitter 160, an optics assembly 170, and an eye tracking unit 180. In alternative configurations, different and/or additional components may be included in the optical block 150. Similarly, functionality of one or more of the components can be distributed among the components in a different manner than is described here. For example, all of the functionality of the pellicle beamsplitter 160 may be contained within the optics assembly 170.

The pellicle beamsplitter 160 is deformable such that the pellicle beamsplitter 160 may have a curvature in one or more planes. For example, the pellicle beamsplitter 160 is curved to form a predetermined shape. The pellicle beamsplitter 160 includes one or more optical surfaces that have an aspheric surface profile, a spherical surface profile, a freeform surface profile, a convex surface profile, a concave surface profile, or some combination thereof. As shown in FIG. 1B, the pellicle beamsplitter 160 tilts towards the optics assembly 170 at a nominal angle between 30 and 50 degrees to a viewing direction. One end of the pellicle beamsplitter 160 is closer to the optics assembly 170 than the other to reflect light from the eye box 145. A typical thickness of the pellicle beamsplitter 160 is very thin (e.g., ~200 microns or less). For example, the pellicle beamsplitter may be less than 50 microns, 100 microns, or 200 microns.

The pellicle beamsplitter 160 transmits light within the first band and reflects light within a second band. For example, the pellicle beamsplitter 160 may transmit light within a visible band (e.g., 400-700 nanometers (nm)), and may reflect light within an infrared (IR) band (e.g., above 780 nm). Additionally, the pellicle beamsplitter 160 may transmit light within a first visible band and may reflect light within a second visible band. The first visible band is different from the second visible band, and may be separate from the second visible band. Alternatively, the pellicle beamsplitter 160 may transmit light within a first IR band and may reflect light within a second IR band. The first IR band is different from the second IR band, and may be separate from the second IR band. In some embodiments, the pellicle beamsplitter 160 transmits light within the first band, reflects light within the second band, and reflects light within a third band. The third band is separate from the first band and the second band. The third band may be a visible band or an IR band.

In some embodiments, the pellicle beamsplitter 160 may preserve polarization of light when the pellicle beamsplitter 160 transmits and/or reflects light within one or more bands. For example, the pellicle beamsplitter 160 may preserve polarization of light when the pellicle beamsplitter 160 transmits and/or reflects light within an infrared band. In some embodiments, the pellicle beamsplitter 160 may transmit light within one or more bands independently of polarization. For example, the pellicle beamsplitter 160 may transmit light within a visible band independently of polarization. In some embodiments, the pellicle beamsplitter 160 may partially reflect and/or transmit light within one or more bands based on a split in polarization. For example, the pellicle beamsplitter 160 may partially reflect P-polarized light that has an electric field polarized parallel to an incidence plane, and may partially transmit S-polarized light that has an electronic field polarized perpendicular to the incidence plane.

In some embodiments, the pellicle beamsplitter 160 has a first and a second optical surface, each having one or more optical coatings. For example, the pellicle beamsplitter 160 has one or more anti-reflection coatings on the first optical surface, and has one or more spectrally selective coatings on the second optical surface.

In some embodiments, the edges of the pellicle beamsplitter 160 closest and furthest from the electronic display 140 are beveled to reduce obscuration of light emitted from the electronic display 140 and to reduce visibility of the pellicle beamsplitter 160 to a viewing user. An example for making the bevel is described in detail in FIG. 3A.

In some embodiments, the pellicle beamsplitter 160 is curved to form a cylindrical shape. The pellicle beamsplitter 160 includes two shape-forming supports that are separated from each other to form a gap, and one or more deformable transparent sheets that separate light of a first band from light of a second band, and directs light of the second band towards the eye tracking unit 180. The one or more deformable transparent sheets are attached to the two supports to form the cylindrical shape. An example for making the pellicle beamsplitter with the cylindrical shape is described in detail in FIG. 3B.

The optics assembly 170 magnifies received visible image light from the electronic display 140, corrects optical errors associated with the image light, and the corrected image light is presented to the eye 190. The optics assembly 170 includes one or more optical elements. An optical element is, e.g., an aperture, a pancake lens, a Fresnel lens, a convex lens, a concave lens, a filter, any other suitable optical element that affects the image light emitted from the electronic display 140, or some combination thereof. Moreover, the optics assembly 170 may include combinations of different optical elements. In some embodiments, one or more of the optical elements in the optics assembly 170 may have one or more coatings, such as partial reflectors or anti-reflective coatings.

Magnification of the image light by the optics assembly 170 allows the electronic display 140 to be physically smaller, weigh less, and consume less power than larger displays. Additionally, magnification may increase a field of view of the displayed content. For example, the field of view of the displayed content is such that the displayed content is presented using almost all (e.g., 110° diagonal), and in some cases all, of the user's instantaneous field of view. In some embodiments, the optics assembly 170 is designed so its effective focal length is larger than the spacing to the electronic display 140, which magnifies the image light projected by the electronic display 140. Additionally, in some embodiments, the amount of magnification may be adjusted by adding or removing optical elements.

The optics assembly 170 may be designed to correct one or more types of optical error. Examples of an optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal comatic aberration, transverse chromatic aberration, or any other type of two-dimensional optical error. Three dimensional errors are optical errors that occur in three dimensions. Example types of three dimensional errors include spherical aberration, chromatic aberration, field curvature, astigmatism, or any other type of three-dimensional optical error. In some embodiments, content provided to the electronic display 140 for display is pre-distorted, and the optics assembly 170 corrects the distortion when it receives image light from the electronic display 140 generated based on the content.

The eye tracking unit 180 tracks movement of the eye 190. Some or all of the eye tracking unit 180 may or may not be in a line of sight of a user wearing the HMD 100. The eye tracking unit 180 is typically located off-axis to avoid obstructing the user's view of the electronic display 140, although the eye tracking unit 180 may alternately be placed elsewhere. Also, in some embodiments, there is at least one eye tracking unit 180 for the user's left eye and at least one eye tracking unit 180 for the user's right eye. In some embodiments, only one eye tracking unit 180 may track both the left and right eye of the user.

The eye tracking unit 180 may include one or more illuminators 182, one or more detectors 184, and a controller 186. The eye tracking unit 180 determines eye tracking information using data (e.g., images) captured by the detector(s) 184 of the eye 190. Eye tracking information describes a position of an eye of the user. Eye tracking information may include, e.g., gaze angle, eye orientation, inter-pupillary distance, vergence depth, some other metric associated with tracking an eye, or some combination thereof. Some embodiments of the eye tracking unit have different components than those described in FIG. 1B.

An illuminator 182 illuminates a portion of the user's eye 190 with light in the second band of light (e.g., IR light) that is different from the first band of light (e.g., visible light) associated with content from the electronic display 140. Examples of the illuminator 182 may include: a laser (e.g., a laser diode, a tunable laser, a continuous wave laser, a pulse laser, a vertical-cavity surface-emitting laser (VCSEL), other suitable laser emitting infrared light), a light emitted diode (LED), an organic LED (OLED), a super radiant LED, a fiber light source, another other suitable light source emitting infrared and/or visible light, or some combination thereof. The illuminator 182 may be opaque, translucent, or transparent to visible light. In various embodiments, the illuminator 182 may emit visible light. In some embodiments, the eye tracking unit 180 may include multiple illuminators 182 for illuminating one or more portions of the eye 190. In some embodiments, a first group of illuminators 182 emit light within a first band (e.g. a visible band), and a second group of illuminators 182 emit light within a second band (e.g., an IR band). For example, a first group of illuminators 182 emit red light, green light, blue light, or some combination thereof. A second group of illuminators 182 emit light with output peaking at 850 nm and 950 nm. In some embodiments, the light emitted from the one or more illuminators 182 is a structured light pattern.

Reflected and/or scattered light from the illuminated portion of the eye 190 passes through the optics assembly 170 and is re-directed by the pellicle beamsplitter 160 to the detector(s) 184. The pellicle beamsplitter 160 separates the light in the second band from visible light of the electronic display 140. To reduce space of the pellicle beamsplitter 160, the pellicle beamsplitter 160 is adjacent to the electronic display 140, and the area of the pellicle beamsplitter 160 projected onto the viewable area of the illuminator 182 is less than the viewable area of the illuminator 182. Additionally, the pellicle beamsplitter 160 is curved to reduce its space. As such, the detector 184 can be placed closer to the pellicle beamsplitter 160 to reduce a form factor of the optical block 150.

The detector 184 detects reflected and/or scattered light from the illuminated portion of the eye 190. The detector 184 outputs a detection signal proportional to the detected light. The detection signal corresponds to a reflectance of the illuminated portion of the eye 190 which correlates with an apparent contrast change (e.g., a contrast change of corneal reflection) through the illuminated portion of the user's eye 190. The detector 184 is a device that converts light into electronic signals. The spectral sensitivity of the detector 184 may be in an infrared band or a visible band depending on the illuminator 182. In some embodiments, the detector 184 may be based on single-point detection (e.g., photodiode, balanced/matched photodiodes, or avalanche photodiode), or based on one or two-dimensional detector arrays (e.g., a camera, linear photodiode array, CCD array, or CMOS array). In some embodiments, the eye tracking unit 180 may include multiple detectors 184 to capture light reflected from one or more illuminated portions of the eye 190.

The controller 186 determines eye tracking information using data (e.g., captured images) from the one or more detectors 184. For example, in some embodiments, the controller 186 identifies locations of reflections of light from the one or more illuminators 182 in an image of the eye 190, and determines a position and an orientation of the eye 190 based on the shape and/or locations of the identified reflections. In cases where the eye 190 is illuminated with a structured light pattern, the controller 186 can detect distortions of the structured light pattern projected onto the eye 190, and can estimate a position and an orientation of the eye 190 based on the detected distortions. The controller 186 can also estimate a pupillary axis, a gaze angle (e.g., corresponds to a foveal axis), a translation of the eye, a torsion of the eye, and a current shape of the eye 190 based on the image of the illumination pattern captured by the detector 184.

Examples of Pellicle Beamsplitter

Figure 2:
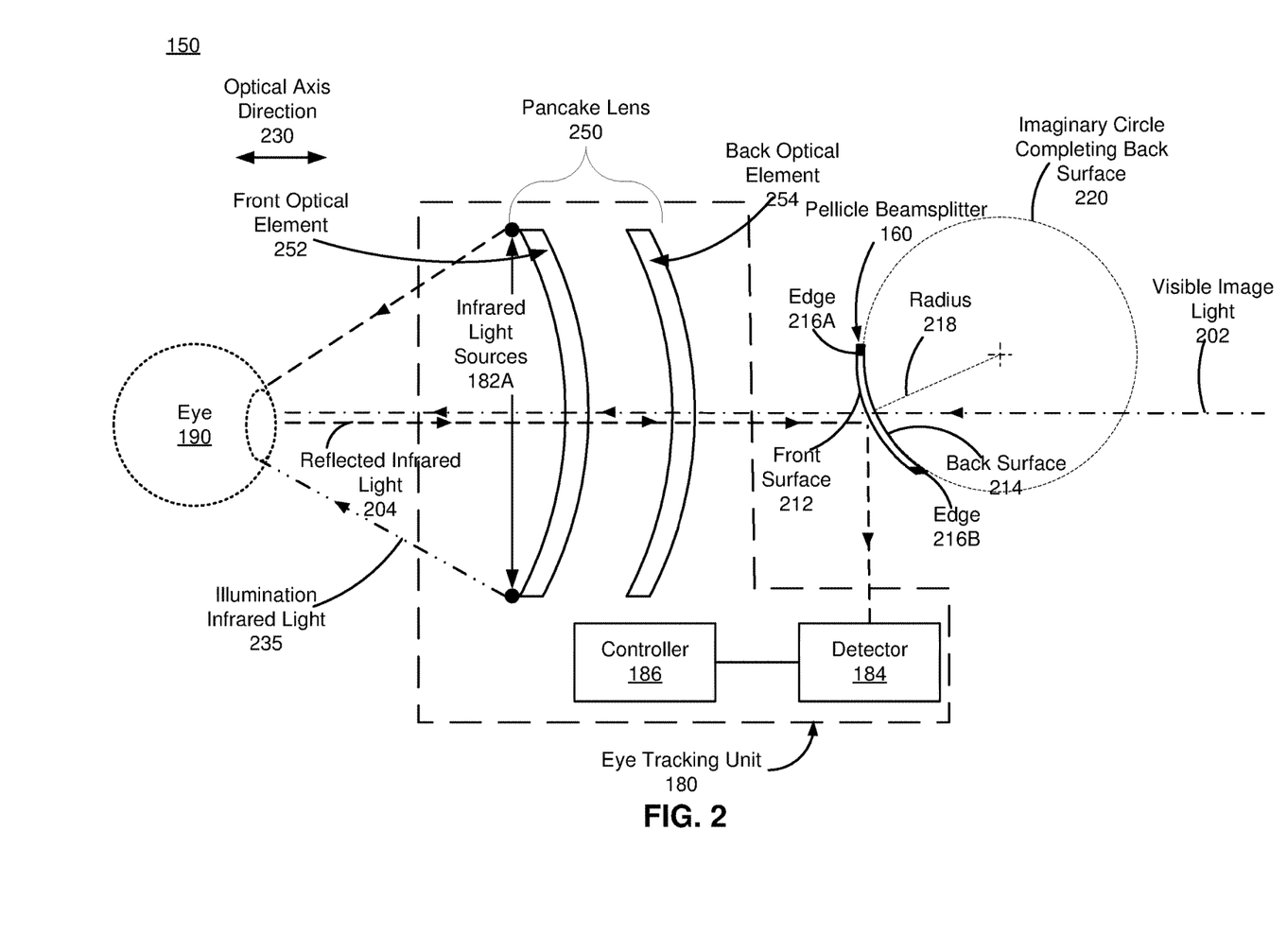
FIG. 2 is a block diagram of an optical block including a pellicle beamsplitter in a HMD, in accordance with an embodiment.

FIG. 2 is a block diagram of an optical block 150 including the pellicle beamsplitter 160 in a HMD, in accordance with an embodiment. The HMD may be, e.g., the HMD 100, or some other HMD. In the example of FIG. 2, the optical block 150 includes the pellicle beamsplitter 160, a pancake lens 250, and the eye tracking unit 180.

The pellicle beamsplitter 160 is positioned along the optical axis direction 230 between the pancake lens 250 and the electronic display 140 (not shown). The pellicle beamsplitter separates visible image light 202 from reflected IR light 204, and redirects reflected IR light 204 towards the eye tracking unit 180. The pellicle beamsplitter 160 includes a front surface 212, a back surface 214, and edges 216A and 216B. Each of the front surface 212 and the back surface 214 has a first radius curvature in a first plane and/or a second radius curvature in a second plane. A radius curvature describes a reciprocal of a curvature. Within a plane, a curve is produced by an intersection of a surface with the plane. The radius curvature of the curve equals a radius of a circular arc that fits the curve within a threshold. The threshold describes a degree of match between the curve and a portion of the circular arc. As shown in FIG. 2, the back surface 214 has a radius curvature 218 that equals an imaginary circle 220 completing the back surface 214. In some embodiments, each of the front surface 212 and the back surface 214 has a first radius curvature only in a first plane to form a cylindrical shape. For example, as shown in FIG. 2, each of the front surface 212 and the back surface 214 has the radius curvature 218 (e.g., 30 mm or 1000 mm, or any radius curvature in the range of 50 mm to 1000 mm) only in this diagram plane to form a cylindrical shape. Alternatively, each of the front surface 212 and the back surface 214 has a first radius curvature in a first plane and a second radius curvature in a second plane to form a spherical shape (e.g., the first radius curvature and the second radius curvature are equal) or to form an aspherical shape (e.g., the first radius curvature and the second radius curvature are not equal). For example, each of the front surface 212 and the back surface 214 has an additional radius curvature in a plane that is perpendicular to this diagram plane to form a spherical shape or to form an aspherical shape.

Each of the front surface 212 and the back surface 214 has one or more optical coatings. For example, the front surface 212 has one or more spectrally selective coatings, and the back surface 214 has one or more anti-reflection coatings.

The pellicle beamsplitter 160 has high transmission (e.g., greater than 90%, 95%, or 99%) for a visible light range including the visible image light 202, and has high reflectivity (e.g., greater than 50%, 75%, or 90%) for an IR light range emitted by the IR light sources 182A (e.g., one embodiment of the illuminator 182). Since Fresnel reflections are typically higher for S-polarized light than P-polarized light, the pellicle beamsplitter 160 is anti-reflected in the visible light range to reduce both S and P polarized light reflection. The back surface 214 is anti-reflected in the visible range, and the front surface 212 is anti-reflected in the visible range, and is highly reflected in the IR light range. For example, the front surface 212 is anti-reflected in the visible range (400 nm-700 nm approximately) of S-polarized visible light and P-polarized visible light. The front surface 212 reflects S-polarized IR light and P-polarized IR light above 700 nm approximately in a manner such that each reflection of the S-polarized IR light and P-polarized IR light is gradually increased to a respective peak. In some embodiments, the pellicle beamsplitter 160 is silica, and a coating stack of 2.13 waves of SiO2, 0.18 TiO2, 0.45 SiO2, 2.02 TiO2, 2.15 SiO2, 1.85 of TiO2, and 1.00 of SiO2, with a reference wavelength of 580 nm, is deposited on the front surface 212.

In some embodiments, the pellicle beamsplitter 160 has a retarder applied to the front surface 212 to correct a difference between a polarization state transmitted through the pellicle beamsplitter 160 and a polarization state from light passing adjacent to the pellicle beamsplitter 160. The impact of the higher reflectivity for P-polarized light than S-polarized light is that circularly polarized light transmitted through the pellicle beamsplitter 160 is converted to a slightly different polarization state from light passing adjacent to the pellicle beamsplitter 160. This difference can result in a reduced brightness and potentially a reduced contrast of content delivered by the visible image light 202. As such, the retarder applied to the front surface 212 prevents the content delivered by the visible image light 202 from reducing brightness and contrast.

In some embodiments, the pellicle beamsplitter 160 compensates an increased brightness of the electronic display 140 in the area that generates light used for display content. For example, a small amount of visible light reflected by the pellicle beamsplitter 160 may make the pellicle beamsplitter 160 visible to the user. The pellicle beamsplitter 160 may appear as a dark area in the center of the user's field of view such that the dark area reduces the increased brightness of the area in the electronic display 140.

In some embodiments, the edges 216 A and 216B are beveled to reduce obscuration of light emitted from the electronic display 140 (not shown) and to reduce visibility of pellicle beamsplitter 160 to a viewing user. An example for making the bevel is described in detail in FIG. 3A.

The curvature may be formed by elastically deforming the pellicle beamsplitter 160, e.g., thermoforming, sagging, casting, or molding. An elastically deforming borosilicate glass creates sufficiently low birefringence such that the deforming does not substantially degrade the performance of displays, including displays that use polarized light. Alternatively, the pellicle beamsplitter 160 may be formed to a simple or complex curve by fastening pellicle beamsplitter 160 to one or more forms. An example is described in detail in FIG. 3B.

The pellicle beamsplitter 160 transmits visible image light 202 from the electronic display 140 (not shown) and the transmitted visible image light 202 is then transmitted by the optics assembly 170 and is output towards an eye box that includes the eye 190. In this example, the optics assembly 170 is the pancake lens 250. The pancake lens 250 includes a front optical element 252 and a back optical element 254. One or more surfaces of the front optical element 252 may be shaped to be spherically concave (e.g., a portion of a sphere), spherically convex, a rotationally symmetric asphere, a freeform shape, or some other shape that mitigates field curvature. In some embodiments, the shape of one or more surfaces of the front optical element 252 and back optical element 254 are designed to additionally correct for other forms of optical aberration. In some embodiments, one or more of the optical elements within pancake lens 250 may have one or more coatings, such as anti-reflective coatings, to reduce ghost images and enhance contrast. For example, the back optical element 254 is approximately 50% transparent and 50% reflective for the visible light. The pancake lens 250 is further described in U.S. Patent Application No. 62/350,644, filed on Jun. 15, 2016, U.S. patent application Ser. No. 15/179,883, filed on Jun. 10, 2016, and U.S. patent application Ser. No. 15/441,738, filed on Feb. 24, 2017, each of which is hereby incorporated by reference in its entirety.

One or more IR light sources 182A are arranged around the edge of the front optical element 252 to provide the illumination IR light 235. For example, an IR light source is positioned outside, at the edge, or on one or both optical surfaces of the front optical element 252 to illuminate a pupil of the eye 190, or provide corneal glint, or both. In some embodiments, one or more additional IR light sources may be arranged in a combination of outside the area of the front optical element 252, at the edge of the front optical element 252, or on one or both optical surfaces of the front optical element 252. In some embodiments, the one more IR light sources 182A placed on the optical surface of the front optical element 252 are sufficiently small as to not be highly noticeable by the user (e.g., less than 0.1 mm$^2$ in area). In some embodiments, the one or more IR light sources 182A may be less than 0.003 mm$^2$ in area, 0.01 mm$^2$ in area, and/or 0.1 mm$^2$ in area. Examples of the IR light sources 182A include LEDs, super radiant LEDs, laser diodes, VSELSs, and OLED. The IR light sources 182A may be opaque, translucent, or transparent to visible light. In some embodiments, the IR light sources 182A pointed at the top of the pellicle beamsplitter 160 such that the illumination IR light 235 reflects to illuminate the eye 190.

The illuminator 182 illuminates a portion of the eye 190 using illumination IR light 235 (shown in dash lines). The reflected IR light 204 from the illuminated portion of the eye 190 passes through the optics assembly 170 and is reflected by the pellicle beamsplitter 160 to the detector 184. The detector 184 may have an equal magnification in different directions (e.g., in both the horizontal and vertical directions), or the detector 184 may have a higher magnification ratio in one direction than in other directions. For example, a positive cylindrical lens may be positioned between the pellicle beamsplitter 160 and the detector 184, or be incorporated into a lens of the detector 184 such that the detector 184 has a higher magnification in a direction along the curvature of the pellicle beamsplitter 160 than in other directions. The curved portions of the pellicle beamsplitter 160 reduces space of the pancake lens 250. As such, the pancake lens 250 can be placed closer to the electronic display 140, and the detector 184 can be placed closer to the pellicle beamsplitter 160 for reducing the form factor of the optical block 150.

The controller 186 controls the illuminator 182 to illuminate the eye 190, such as turning on and turning off the illuminator 182, changing illumination positions, and instructing the illuminator 182 to illuminate a structural pattern. The controller 186 also controls the detector 184, such as controlling settings (e.g., exposure time, and gain,), and analyzing data from the detector 184 to estimate the eye's movement. Additionally, in some embodiments, the controller 186 controls the pancake lens to vary a focal length (or optical power) of the HMD 100 to keep a user's eyes in a zone of comfort as vergence and accommodation change. The controller 186 may control a varifocal element that is able to change a distance between an optical element in the pancake lens 250 and the electronic display 140, and thereby adjust a location of an image plane for content being presented to a use of the HMD.

Figure 3A:
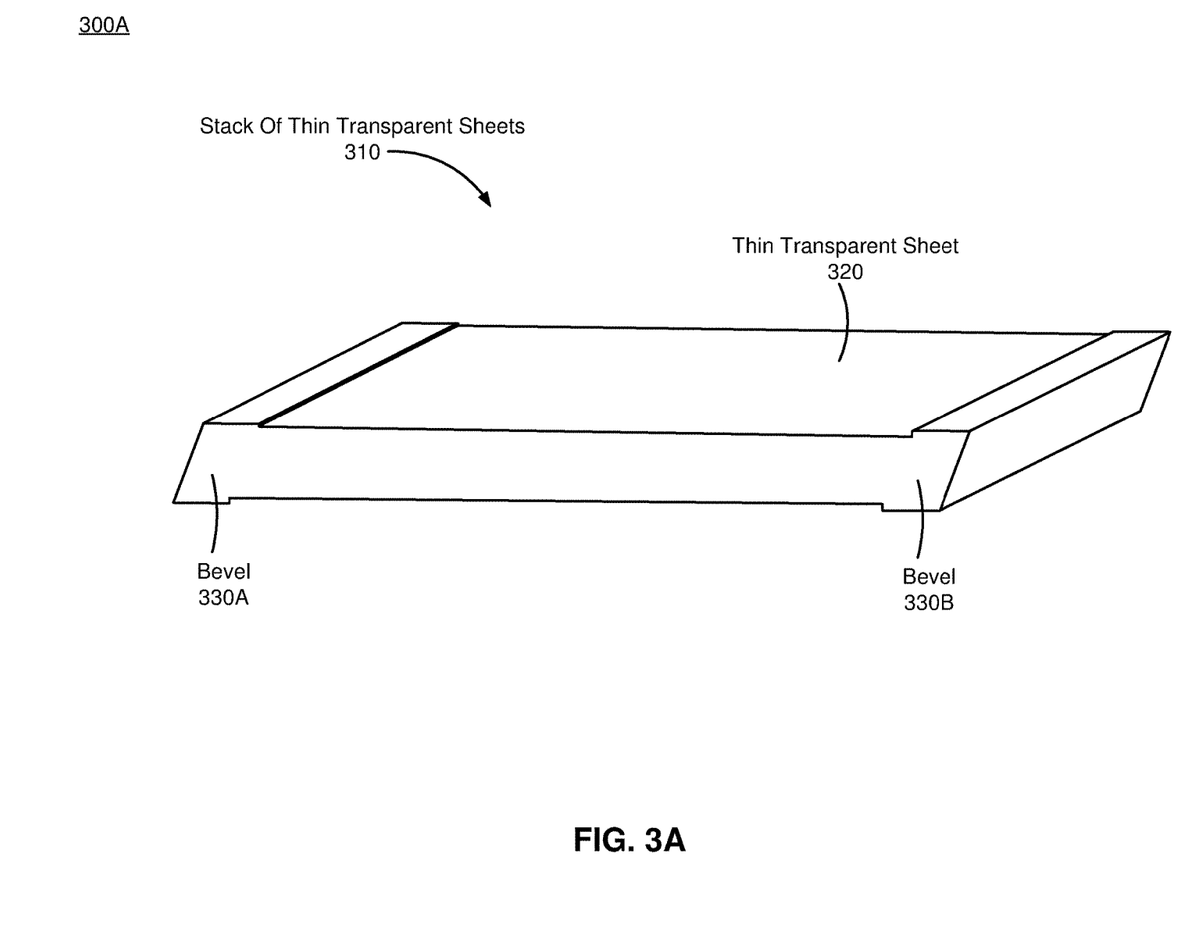
FIG. 3A is a block diagram of a pellicle beamsplitter before deformation, in accordance with an embodiment.

FIG. 3A is a block diagram of a pellicle beamsplitter 300A before deformation, in accordance with an embodiment. The pellicle beamsplitter 300A is one embodiment of the pellicle beamsplitter 160. The pellicle beamsplitter 300A includes a stack 310 of thin transparent sheets 320. The sheets 320 may be made from glass or plastic. One or more edges of the stack 310 are canted at a desired angle for bevels 330A and 330B. The stack 310 is cut or grounded using appropriate machining techniques based on material of the stack 310. One or more edges of the bevels 330A and 330B may be left as a rough surface, or may be polished. In some embodiments, one or more black or other absorbing coating may be applied to the edges of the bevels 330A and 330B while the sheets 320 are still stacked. Examples of absorbers include chrome black, Sp2 or Sp2/Sp3 carbon compounds such as graphite and graphitic materials, and organic or organometallic coatings of dyes and pigments. The absorbers can be deposited as thin films. The antireflective and IR reflective coatings may be applied to the sheets 320 before or after bevels 330A and 330B are applied.

The sheets 320 can be formed with a desired curvature by sagging or molding the sheets 320. Alternatively, the sheets 320 may be formed to a simple or complex curve by fastening it to one or more forms such that the remaining portions of the sheets 320 are formed to a desired shape (e.g., a cylindrical shape as described below).

Figure 3B:
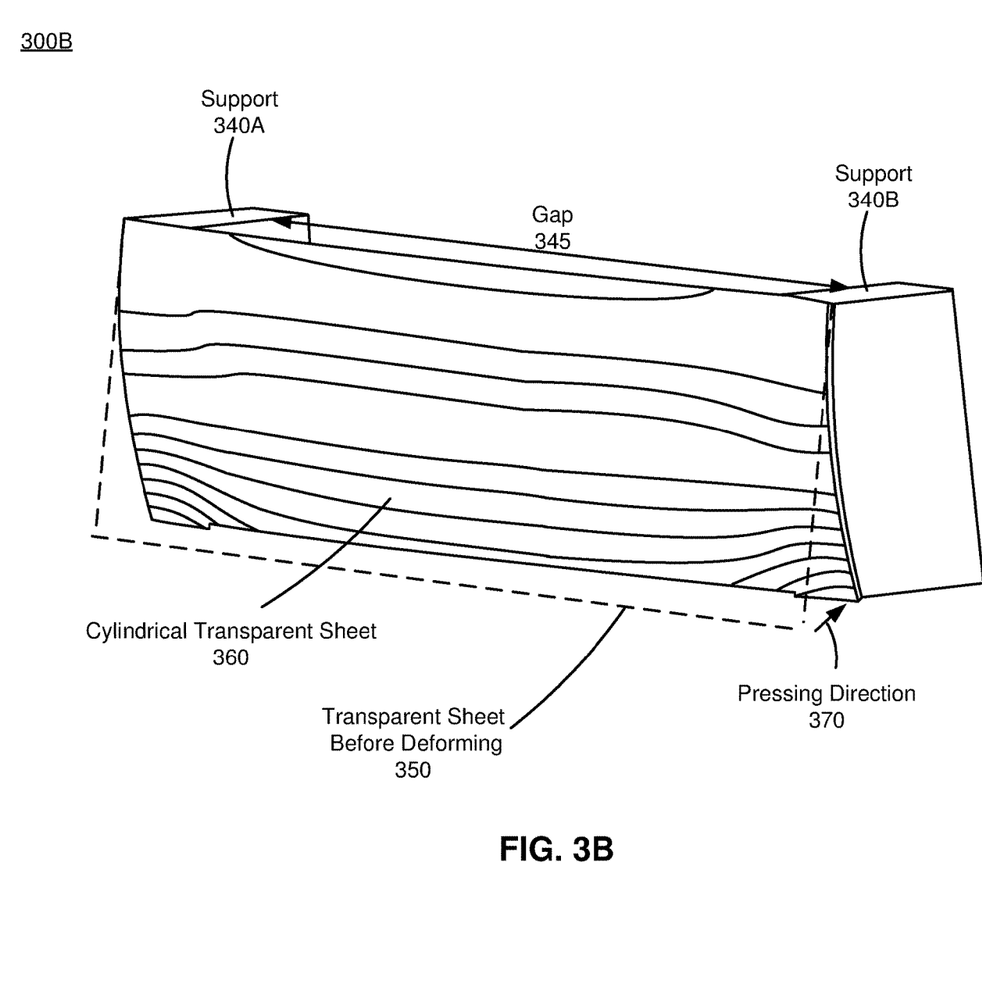
FIG. 3B is a block diagram of a pellicle beamsplitter, in accordance with another embodiment.

FIG. 3B is a block diagram of a pellicle beamsplitter 300B, in accordance with another embodiment. The transparent sheet 350 before deforming is one embodiment of the thin transparent sheet 320. The transparent sheet 350 is made of borosilicate glass (e.g., 70 mm long, 7 mm wide and 100 microns thick). Two supports (also referred to as forms) 340A and 340B support a span of the transparent sheet 350. The supports 340A and 340B are rigid (e.g., stainless steel). The supports 340A and 340B are separated from each other to form a gap 345. The gap 345 describes a distance that exceeds a threshold value of a distance between the two supports 340A and 340B. A surface attaching to the one or more deformable transparent sheets of each support includes the first radius curvature. To form the transparent sheet 350 into a cylindrical shape with a predetermined radius curvature, the transparent sheet 350 is pressed against the supports 340A and 340B along the pressing direction 370. A surface attaching to the transparent sheet 350 of each support 340A and 340B has a radius curvature (e.g., 20 mm) that equals to the predetermined radius curvature. For example, a force (e.g., 1 Newton (N)) is applied to each of the edges of the transparent sheet 350 such that each edge is fastened to a corresponding support 340A or 340B to form a cylindrical transparent sheet 360 with the predetermined radius curvature. The supports 340A and 340B may apply a controlled amount of tension. Additionally and/or alternatively, one or more portions of the supports 340 along a length of the transparent sheet 350 may have a coefficient of thermal expansion that is within a threshold value of a coefficient of thermal expansion of the transparent sheet 350. For example, the difference in the coefficient of thermal expansion between the one or more portions of the supports 340 and the transparent sheet 350) is less than 1e-5/K, 5e-6/K, or 2e-6/K.

For example, the coefficient of thermal expansion of the supports 340A and 340B matches the one of the transparent sheet 350. As shown in FIG. 3B, deforming from the edges produces a uniform curvature along the length of the cylindrical transparent sheet 360.

Example of Pellicle Beamsplitter In Head-Mounted Display System

Figure 4:
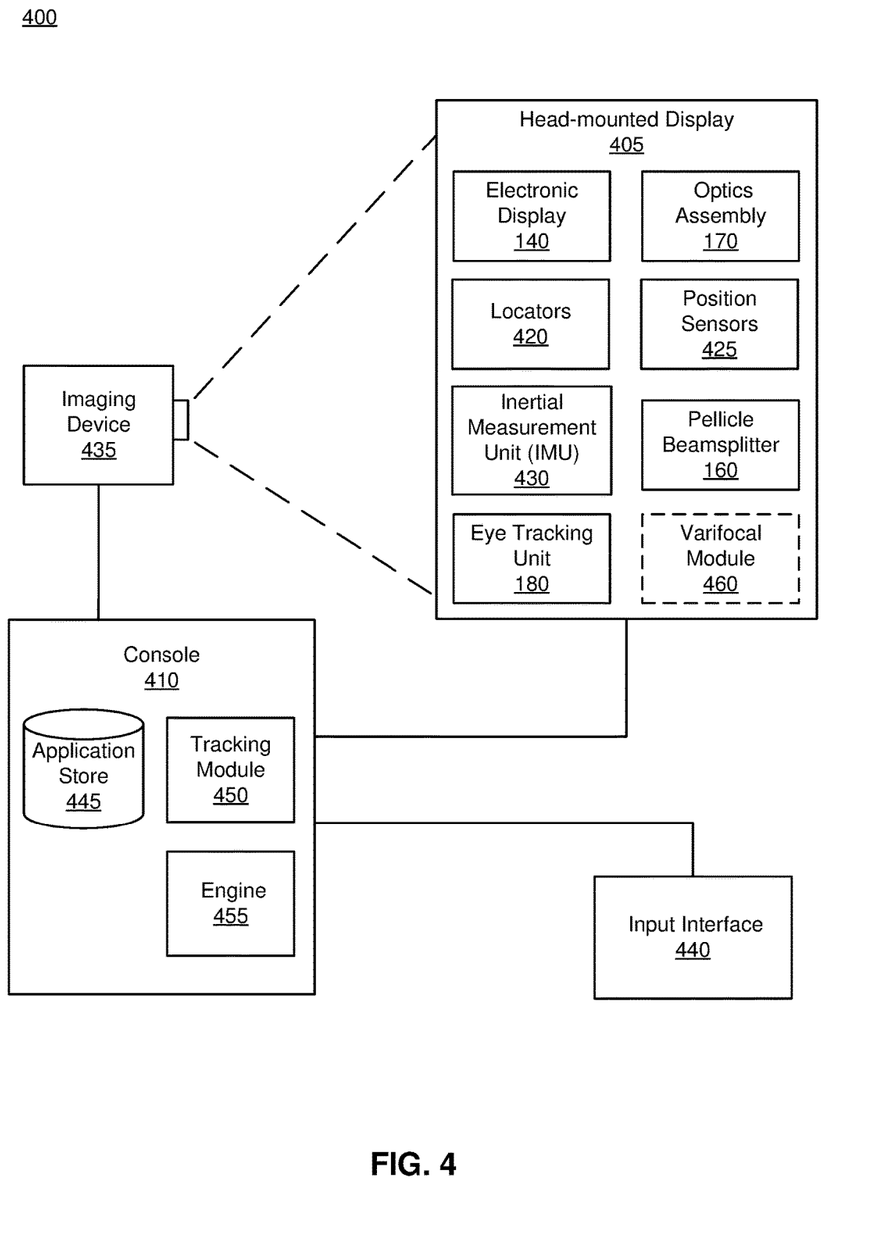
FIG. 4 is a block diagram of a HMD system environment including a pellicle beamsplitter, in accordance with an embodiment.

FIG. 4 is a block diagram of a system 400 in which an HMD 405 operates. The system 400 shown by FIG. 4 comprises a HMD 405, an imaging device 435, and an input interface 440 that are each coupled to the console 410. While FIG. 4 shows an example system 400 including one HMD 405, one imaging device 435, and one input interface 440, in other embodiments any number of these components may be included in the system 400. For example, there may be multiple HMDs 405 each having an associated input interface 440 and being monitored by one or more imaging devices 435, with each HMD 405, input interface 440, and imaging devices 435 communicating with the console 410. In alternative configurations, different and/or additional components may be included in the system 400. Similarly, functionality of one or more of the components can be distributed among the components in a different manner than is described here. For example, some or all of the functionality of the console 410 may be contained within the HMD 405. The system 400 may operate in a VR system environment, an AR system environment, a MR system environment, or some combination thereof.

The HMD 405 presents content to a user. In some embodiments, the HMD 405 is the HMD 100. Examples of content presented by the HMD 405 include one or more images, video, audio, or some combination thereof. In some embodiments, audio is presented via an external device (e.g., speakers and/or headphones) that receives audio information from the HMD 405, the console 410, or both, and presents audio data based on the audio information. The HMD 405 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the HMD 405 may present VR, AR, MR, or some combination thereof to a user. In the AR and/or MR embodiments, the HMD 405 may augment views of a physical, real-world environment with computer-generated elements (e.g., images, video, sound, etc.).

The HMD 405 includes an electronic display 140, the optics assembly 170, one or more locators 420, one or more position sensors 425, an inertial measurement unit (IMU) 430, the Pellicle beamsplitter 160, the eye tracking unit 180, and a varifocal module 460 (optional). Some embodiments of the HMD 405 have different components than those described here. Similarly, the functions can be distributed among other components in the system 400 in a different manner than is described here. For example, some of the functions of the varifocal module 460 may be performed by the eye tracking unit 180. Some of the functions of the eye tracking unit 180 may be performed by the console 410.

The electronic display 140 displays images to the user in accordance with data received from the console 410.

The optical assembly 170 magnifies image light received from the electronic display 140, corrects optical errors associated with the image light, and presents the corrected image light to a user of the HMD 405. In some embodiments, the optics assembly 170 includes the pancake lens 250 to vary a focal length of the system 400. In some embodiments, the pancake lens 250 is controlled by the varifocal module 460. The pellicle beamsplitter 160 transmits the visible image light passing through the optics assembly 170 towards the user's eye. The pellicle beamsplitter 160 also directs IR light reflected from the user's eye to the eye tracking unit 180 for estimating the eye's movement. The pellicle beamsplitter 160 is adjacent to the electronic display 140, and the area of the pellicle beamsplitter 160 projected onto the viewable area of the illuminator 182 in the eye tracking unit 180 is less than the viewable area of the illuminator 182. Additionally, the pellicle beamsplitter 160 is curved to reduce its space. As such, the detector 184 can be placed closer to the pellicle beamsplitter 160 to reduce a form factor of the optical block 150.

The eye tracking unit 180 is integrated into the HMD 405. The eye tracking unit 180 determines eye tracking information associated with an eye of a user wearing the HMD 405. The eye tracking unit 180 receives light from the pellicle beamsplitter 160 that it uses to determine eye tracking information. The eye tracking information determined by the eye tracking unit 180 may comprise information about a position of the user's eye, i.e., information about an angle of an eye-gaze.

The varifocal module 460 includes a varifocal element that causes the pancake lens 250 to vary the focal length (or optical power) of the HMD 405 to keep a user's eyes in a zone of comfort as vergence and accommodation change. In one embodiment, the varifocal module 460 physically changes the distance between the two optical elements of pancake lens 250. Alternatively, the varifocal module 460 changes the focal length of pancake lens 250 by applying a force to one of the back optical element 254 or the front optical element 252 described in FIG. 2.

The locators 420 are objects located in specific positions on the HMD 405 relative to one another and relative to a specific reference point on the HMD 405. A locator 420 may be a light emitting diode (LED), a corner cube reflector, a reflective marker, a type of light source that contrasts with an environment in which the HMD 405 operates, or some combination thereof. In embodiments where the locators 420 are active (i.e., an LED or other type of light emitting device), the locators 420 may emit light in the visible band (~380 nm to 750 nm), in the IR band (~750 nm to 1700 nm), in the ultraviolet band (200 nm to 380 nm), some other portion of the electromagnetic spectrum, or some combination thereof.

In some embodiments, the locators 420 are located beneath an outer surface of the HMD 405, which is transparent to the wavelengths of light emitted or reflected by the locators 420 or is thin enough not to substantially attenuate the wavelengths of light emitted or reflected by the locators 420. Additionally, in some embodiments, the outer surface or other portions of the HMD 405 are opaque in the visible band of wavelengths of light. Thus, the locators 420 may emit light in the IR band under an outer surface that is transparent in the IR band but opaque in the visible band.

The IMU 430 is an electronic device that generates fast calibration data based on measurement signals received from one or more of the position sensors 425. A position sensor 425 generates one or more measurement signals in response to motion of the HMD 405. Examples of position sensors 425 include: one or more accelerometers, one or more gyroscopes, one or more magnetometers, another suitable type of sensor that detects motion, a type of sensor used for error correction of the IMU 430, or some combination thereof. The position sensors 425 may be located external to the IMU 430, internal to the IMU 430, or some combination thereof.

Based on the one or more measurement signals from one or more position sensors 425, the IMU 430 generates fast calibration data indicating an estimated position of the HMD 405 relative to an initial position of the HMD 405. For example, the position sensors 425 include multiple accelerometers to measure translational motion (forward/back, up/down, left/right) and multiple gyroscopes to measure rotational motion (e.g., pitch, yaw, and roll). In some embodiments, the IMU 430 rapidly samples the measurement signals and calculates the estimated position of the HMD 405 from the sampled data. For example, the IMU 430 integrates the measurement signals received from the accelerometers over time to estimate a velocity vector and integrates the velocity vector over time to determine an estimated position of a reference point on the HMD 405. Alternatively, the IMU 430 provides the sampled measurement signals to the console 410, which determines the fast calibration data. The reference point is a point that may be used to describe the position of the HMD 405. While the reference point may generally be defined as a point in space; however, in practice the reference point is defined as a point within the HMD 405 (e.g., a center of the IMU 130).

The IMU 430 receives one or more calibration parameters from the console 410. As further discussed below, the one or more calibration parameters are used to maintain tracking of the HMD 405. Based on a received calibration parameter, the IMU 430 may adjust one or more IMU parameters (e.g., sample rate). In some embodiments, certain calibration parameters cause the IMU 430 to update an initial position of the reference point so it corresponds to a next calibrated position of the reference point. Updating the initial position of the reference point at the next calibrated position of the reference point helps reduce accumulated error associated with the determined estimated position. The accumulated error, also referred to as drift error, causes the estimated position of the reference point to "drift" away from the actual position of the reference point over time.

The imaging device 435 generates slow calibration data in accordance with calibration parameters received from the console 410. Slow calibration data includes one or more images showing observed positions of the locators 420 that are detectable by the imaging device 435. The imaging device 435 may include one or more cameras, one or more video cameras, any other device capable of capturing images including one or more of the locators 420, or some combination thereof. Additionally, the imaging device 435 may include one or more hardware and software filters (e.g., used to increase signal to noise ratio). The imaging device 435 is configured to detect light emitted or reflected from locators 420 in a field of view of the imaging device 435. In embodiments where the locators 420 include passive elements (e.g., a retroreflector), the imaging device 435 may include a light source that illuminates some or all of the locators 420, which retro-reflect the light towards the light source in the imaging device 435. Slow calibration data is communicated from the imaging device 435 to the console 410, and the imaging device 435 receives one or more calibration parameters from the console 410 to adjust one or more imaging parameters (e.g., focal length, focus, frame rate, ISO, sensor temperature, shutter speed, aperture, etc.).

The input interface 440 is a device that allows a user to send action requests to the console 410. An action request is a request to perform a particular action. For example, an action request may be to start or end an application or to perform a particular action within the application. The input interface 440 may include one or more input devices. Example input devices include: a keyboard, a mouse, a game controller, or any other suitable device for receiving action requests and communicating the received action requests to the console 410. An action request received by the input interface 440 is communicated to the console 410, which performs an action corresponding to the action request. In some embodiments, the input interface 440 may provide haptic feedback to the user in accordance with instructions received from the console 410. For example, haptic feedback is provided when an action request is received, or the console 410 communicates instructions to the input interface 440 causing the input interface 440 to generate haptic feedback when the console 410 performs an action.

The console 410 provides content to the HMD 405 for presentation to the user in accordance with information received from one or more of: the imaging device 435, the HMD 405, the input interface 440, and the eye tracking unit 180. In the example shown in FIG. 1, the console 410 includes an application store 445, a tracking module 450, and an engine 455. Some embodiments of the console 410 have different modules than those described in conjunction with FIG. 1. Similarly, the functions further described below may be distributed among components of the console 410 in a different manner than is described here.

The application store 445 stores one or more applications for execution by the console 410. An application is a group of instructions, that when executed by a processor, generates content for presentation to the user. Content generated by an application may be in response to inputs received from the user via movement of the HMD 405, the input interface 440, or the eye tracking unit 180. Examples of applications include: gaming applications, conferencing applications, video playback application, or other suitable applications.

The tracking module 450 calibrates the system 400 using one or more calibration parameters and may adjust one or more calibration parameters to reduce error in determination of the position of the HMD 405. For example, the tracking module 450 adjusts the focus of the imaging device 435 to obtain a more accurate position for observed locators on the HMD 405. Moreover, calibration performed by the tracking module 450 also accounts for information received from the IMU 430. Additionally, if tracking of the HMD 405 is lost (e.g., the imaging device 435 loses line of sight of at least a threshold number of the locators 420), the tracking module 450 re-calibrates some or all of the system 400.

The tracking module 450 tracks movements of the HMD 405 using slow calibration information from the imaging device 435. The tracking module 450 determines positions of a reference point of the HMD 405 using observed locators from the slow calibration information and a model of the HMD 405. The tracking module 450 also determines positions of a reference point of the HMD 405 using position information from the fast calibration information. Additionally, in some embodiments, the tracking module 450 may use portions of the fast calibration information, the slow calibration information, or some combination thereof, to predict a future location of the HMD 405. The tracking module 450 provides the estimated or predicted future position of the HMD 405 to the engine 455.

The engine 455 executes applications within the system 400 and receives position information, acceleration information, velocity information, predicted future positions, or some combination thereof of the HMD 405 and the eye tracking unit 180 from the tracking module 450. Based on the received information, the engine 455 determines content to provide to the HMD 405 for presentation to the user. For example, if the received information indicates that the user has looked to the left, the engine 455 generates content for the HMD 405 that mirrors the user's movement in a virtual environment. Similarly, if information received from the eye tracking unit 180 indicates the user gazing on a location, the engine 455 generates content based on the identified gazing location, such as a visual representation of the scene at the gazing location with an original display resolution and surrounding scenes with a reduced display resolution. Additionally, in some embodiments, if the received information indicates that tracking of the eye tracking unit 180 is lost, the engine 455 generates content indicating the HMD 405 is to be adjusted for presentation by the HMD 405. Additionally, the engine 455 performs an action within an application executing on the console 410 in response to an action request received from the input interface 440, or the eye tracking unit and provides feedback to the user that the action was performed. The provided feedback may be visual or audible feedback via the HMD 405 or haptic feedback via the input interface 440. For example, the engine 455 receives an action from the eye tracking unit 180 to open an application, so the engine 455 opens the application and presents content from the application to the user via the HMD 405.

In some embodiments, the engine 455 can be configured to utilize, in association with the console 410 and the HMD 405, the eye tracking information obtained from the eye tracking unit 180 for a variety of display and interaction applications. The various applications include, but are not limited to, providing user interfaces (e.g., gaze-based selection), attention estimation (e.g., for user safety), gaze-contingent display modes (e.g., foveated rendering, varifocal optics, adaptive optical distortion correction, synthetic depth of field rendering), metric scaling for depth and parallax correction (e.g., IPD and eye-box adjustment), etc. In some embodiments, based on information about position and orientation of the user's eye received from the eye tracking unit 180, the engine 455 determines resolution of the content provided to the HMD 405 for presentation to the user on the electronic display 140. The engine 455 provides the content to the HMD 405 having a maximum pixel density (maximum resolution) on the electronic display 140 in a foveal region of the user's gaze, whereas the engine 455 provides a lower pixel resolution in other regions of the electronic display 140, thus achieving less power consumption at the HMD 405 and saving computing cycles of the console 410 without compromising a visual experience of the user. In some embodiments, the engine 455 can be configured to optimize the performance of other components of the HMD 405 based on the eye tracking information obtained from the eye tracking unit 180. In an alternate embodiment, the engine 455 can adjust focus of images displayed on the electronic display 140, e.g., to prevent vergence-accommodation conflict.

Additional Configuration Information

The foregoing description of the embodiments of the disclosure have been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed:

1. A head-mounted display (HMD) comprising:
   an electronic display including at least one light source configured to generate image light;
   an optics assembly configured to direct the image light in a first frequency band from the electronic display to an eye box, the optics assembly including one or more optical elements that are positioned along an optical axis shared with the electronic display and a pellicle beamsplitter, and the eye box comprises a region in space intended to be occupied by an eye of a user; and
   the pellicle beamsplitter comprising a front surface and a back surface, the pellicle beamsplitter is positioned along the optical axis in series between the optics assembly and the electronic display and is configured to redirect light in a second frequency band passing through the optics assembly toward a first position and to transmit the image light in the first frequency band, wherein each of the front surface and the back surface comprising a first radius curvature in a first plane and a second radius curvature in a second plane that is perpendicular to the first plane.

2. The HMD of claim 1, further comprising:
   an eye tracking unit configured to generate eye tracking information, the eye tracking unit comprising:
      an illuminator configured to illuminate portions of the eye of the HMD with light in the second frequency band,
      a detector located in the first position, the detector configured to capture light in the second frequency band reflected from the eye of the user through the optics assembly and reflected from the pellicle beamsplitter, and
      a controller configured to determine eye tracking information using the captured light in the second frequency band; and
   wherein the HMD is configured to adjust an image displayed on the electronic display based on the eye tracking information.

3. The HMD of claim 1, wherein the pellicle beamsplitter is made of glass.

4. The HMD of claim 1, wherein a thickness of the pellicle beamsplitter is less than 50 microns.

5. The HMD of claim 1, wherein the first radius curvature is different from the second radius curvature.

6. The HMD of claim 1, wherein the pellicle beamsplitter comprises two supports and one or more deformable transparent sheets configured to transmit light in the first frequency band and to reflect light in the second frequency band, wherein the supports are configured to fasten edges of the one or more deformable transparent sheets to produce the first radius curvature in the first plane, the supports are separated from each other to form a gap, and a surface attaching to the one or more deformable transparent sheets of each support comprises the first radius curvature.

7. The HMD of claim 6, wherein one or more portions of the supports along a length of the one or more deformable transparent sheets comprise a coefficient of thermal expansion that is within a threshold value of a coefficient of thermal expansion of the one or more deformable transparent sheets.

8. The HMD of claim 1, wherein the pellicle beamsplitter comprises one or more anti-reflection coatings on the back surface, and comprises one or more spectrally selective coatings on the front surface.

9. The HMD of claim 1, wherein the pellicle beamsplitter comprises a retarder applied to the front surface to correct a difference between a polarization state transmitted through the pellicle beamsplitter and a polarization state from light passing adjacent to the pellicle beamsplitter.

10. The HMD of claim 1, wherein one or more edges of the pellicle beamsplitter are beveled to a predetermined angle.

11. A head-mounted display (HMD) comprising:
an electronic display including at least one light source configured to generate image light;
a pancake lens configured to direct the image light in a first frequency band from the electronic display to an eye box, the pancake lens including a front optical element and a back optical element that are positioned along an optical axis shared with the electronic display and a pellicle beamsplitter, and the eye box comprises a region in space intended to be occupied by an eye of a user; and
the pellicle beamsplitter comprising a front surface and a back surface, the pellicle beamsplitter is positioned along the optical axis in series between the pancake lens and the electronic display and is configured to redirect light in a second frequency band passing through the pancake lens toward a first position and to transmit the image light in the first frequency band, wherein each of the front surface and the back surface comprising a first radius curvature in a first plane and a second radius curvature in a second plane that is perpendicular to the first plane.

12. The HMD of claim 11, further comprising:
an eye tracking unit configured to generate eye tracking information, the eye tracking unit comprising:
an illuminator configured to illuminate portions of the eye of the HMD with light in the second frequency band,
a detector located in the first position, the detector configured to capture light in the second frequency band reflected from the eye of the user through the pancake lens and reflected from the pellicle beamsplitter, and
a controller configured to determine eye tracking information using the captured light in the second frequency band; and
a varifocal element configured to adjust at least one of the front optical element or the back optical element to change a focal length of the pancake lens based at least in part on the determined eye tracking information.

13. The HMD of claim 11, wherein the pellicle beamsplitter is made of glass.

14. The HMD of claim 11, wherein a thickness of the pellicle beamsplitter is less than 50 microns.

15. The HMD of claim 11, wherein the first radius curvature is different from the second radius curvature.

16. The HMD of claim 11, wherein the pellicle beamsplitter comprises two supports and one or more deformable transparent sheets configured to transmit light in the first frequency band and to reflect light in the second frequency band, wherein the supports are configured to fasten edges of the one or more deformable transparent sheets to produce the first radius curvature in the first plane, the supports are separated from each other to form a gap, and a surface attaching to the one or more deformable transparent sheets of each support comprises the first radius curvature.

17. The HMD of claim 16, wherein one or more portions of the supports along a length of the one or more deformable transparent sheets comprise a coefficient of thermal expansion that is within a threshold value of a coefficient of thermal expansion of the one or more deformable transparent sheets.

18. The HMD of claim 11, wherein the pellicle beamsplitter comprises one or more anti-reflection coatings on the back surface, and comprises one or more spectrally selective coatings on the front surface.

19. The HMD of claim 11, wherein the pellicle beamsplitter comprises a retarder applied to the front surface to correct a difference between a polarization state transmitted through the pellicle beamsplitter and a polarization state from light passing adjacent to the pellicle beamsplitter.

20. A method comprising:
generating image light by at least one light source in an electronic display;
directing, by an optics assembly, image light in a first frequency band from the electronic display to an eye box, the optics assembly including one or more optical elements that are positioned along an optical axis shared with the electronic display and a pellicle beamsplitter, and the eye box comprises a region in space intended to be occupied by an eye of a user; and
redirecting, by the pellicle beamsplitter, light in a second frequency band passing through the optics assembly toward a first position and to transmit the image light in the first frequency band, wherein the pellicle beamsplitter is positioned along the optical axis in series between the optics assembly and the electronic display, the pellicle beamsplitter comprises a front surface and a back surface, and each of the front surface and the back surface comprises a first radius curvature in a first plane and a second radius curvature in a second plane that is perpendicular to the first plane.

* * * * *